United States Patent [19]

Verkler

[11] Patent Number: 4,690,044
[45] Date of Patent: Sep. 1, 1987

[54] HAMBURGER COOKING APPARATUS

[75] Inventor: Charles E. Verkler, Peoria, Ill.

[73] Assignee: International Food Equipment Inc., Peoria, Ill.

[21] Appl. No.: 923,200

[22] Filed: Oct. 27, 1986

[51] Int. Cl.$^4$ .............................................. A47J 37/04
[52] U.S. Cl. ........................................................ 99/419
[58] Field of Search .............. 99/419, 421 R, 421 HV, 99/421 TP, 358, 442, 443, 403, 404, 407, 401

[56] References Cited

U.S. PATENT DOCUMENTS

| | | | |
|---|---|---|---|
| 2,773,442 | 12/1956 | Contreras | 99/407 X |
| 3,602,130 | 8/1971 | Perez | 99/404 |
| 3,996,847 | 12/1976 | Reed | 99/419 |
| 4,261,258 | 4/1981 | Reed | 99/401 X |

*Primary Examiner*—H. Hampton Hunter
*Attorney, Agent, or Firm*—Donald E. Egan

[57] ABSTRACT

A hamburger cooking device including a grill member of a heat-conductive material for impaling and holding a hamburger patty. The grill member is supported on an arm which, in turn is pivotally supported with respect to the base of the device. A fork member is provided that is interfittable with the grill member so as to underlie a hamburger patty impaled on the grill member. The fork member is supported on a fork arm and is movable with respect to the grill member to selectively remove a cooked hamburger patty. To this end, the fork arm is pivotally mounted to the grill arm and a stationary former member is disposed above the grill member and fork member, while a reservoir containing heated liquid is disposed below the grill arm and fork arm. The grill member and fork member are oscillated between a first position adjacent the stationary former member and a second position in which the grill and fork members are immersed in the heated cooking liquid held in the reservoir. The grill and fork members are moved in unison when moving from the stationary former into the reservoir, but separately, with the fork member leading the grill member, when moving from the reservoir toward the stationary former, so that the fork member removes a cooked patty previously impaled on the grill member.

10 Claims, 4 Drawing Figures

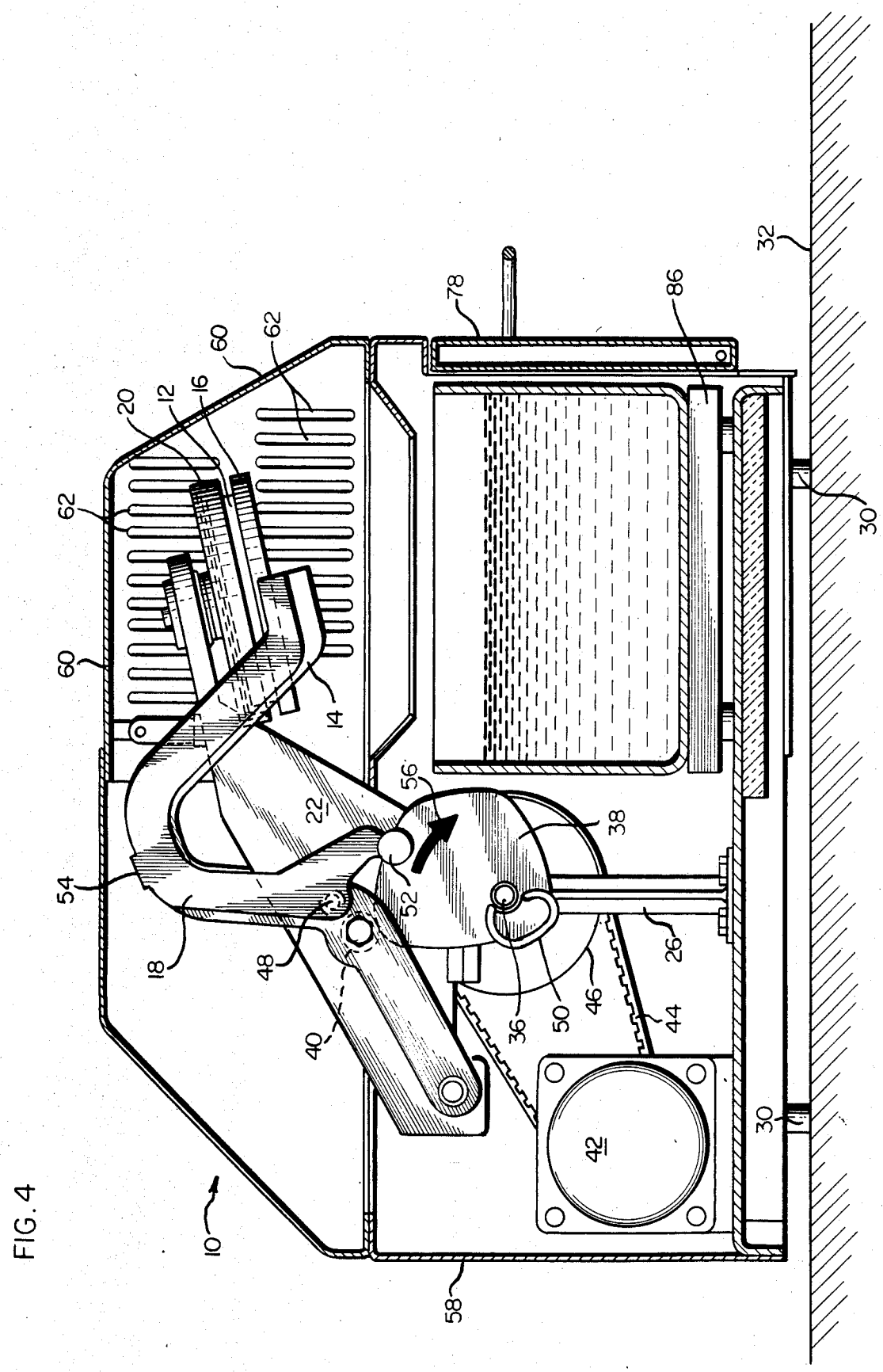

HAMBURGER COOKING APPARATUS

The present invention relates to an apparatus for preparing food items such as hamburger patties and, more particularly, to an improved apparatus for rapidly cooking hamburger patties.

Hamburgers have long been a popular fast-food item and have typically been prepared by frying or broiling. In general, hamburgers are most palatable if they are cooked slowly at relatively low temperatures—less than 250° F.—which provides for the retention of the flavorful juices and fats while reducing weight loss and shrinkage. However, rapidly frying or broiling hamburgers requires high cooking temperatures—generally between 350° F. and 600° F.—which are deleterious to the taste of the resulting hamburgers. Additionally, meat cooked at temperatures in excess of 250° is suspected of having carcinogenic characteristics.

In order to rapidly cook hamburger patties at low temperatures, apparatus have been developed in which the hamburger patty is impaled on the projecting fins of a grill, with the fins being heated by conduction to cook the interior of the patty. See, generally, U.S. Pat. Nos. 3,996,847 and 4,261,258, which are herein incorporated by reference. The latter patent discloses a floor-standing hamburger cooking machine which is designed for use in an establishment where there is a need to prepare a great number of hamburgers at any given time. As illustrated, the apparatus utilizes a circular wheel that can simultaneously prepare as many as 18 hamburger patties. Each hamburger patty is impaled on a separate grill member associated with the wheel and the wheel is rotated to immerse the hamburger patty in a cooking liquid for a predetermined period of time. Contact of the patty with the cooking liquid directly cooks the exterior of the patty, while the grill members are heated through-conduction to simultaneously cook the interior of the patty. The cooking liquid, which may be oil, beef tallow or, preferably, a water-based fluid, is heated to between approximately 160° F. to 220° F. and each patty is submerged in the cooking liquid approximately 30 seconds, the time varying depending upon the thickness of the patty.

Such an apparatus has provided a means for rapidly preparing a great number of more-palatable hamburgers, as is required by high-volume, fast food outlets. However, because of its size and capacity, it is not well suited for use in smaller establishments, such as snack shops or barrooms, that may lack the space, kitchen facilities, and customer demand needed to fully realize the advantages of the abovedescribed device. While smaller establishments have a need for rapidly cooking hamburgers, such establishments seldom need to prepare more than two or three hamburgers at any given time. Accordingly, the use of the above-described hamburger cooking machine in a small establishment would result in an inefficient use of space and energy.

Also, at smaller food outlets, the number of employees is generally much less than that at high volume fast food outlets. While there may be specialization and division of labor for employees of large fast food outlets, with certain employees having for their sole responsibility the operation of the hamburger cooking device of the type described above, at small snack shops and barrooms often a single employee may have to perform all tasks associated with the operation of the business. Consequently, a hamburger cooking machine for use in such an establishment must be simple and reliable in operation and easy to maintain.

Accordingly, it is the principal object of the present invention to provide an improved apparatus for preparing food items such as hamburgers.

More particularly, it is an object of the invention to provide such a hamburger preparation apparatus that is simple and reliable in operation.

It is a further object to provide such an apparatus that is compact and particularly suited for use in establishments where only limited numbers of hamburgers may be required to be prepared at any given time.

These objects, and others that will become apparent upon reference to the following detailed description and accompanying drawings, are provided by a hamburger cooking device including a grill means of a heat-conductive material for impaling and holding a hamburger patty. The grill means is supported on an arm which, in turn, is pivotally supported with respect to the base of the device. Fork means are provided that are interfittable with the grill means so as to underlie a hamburger patty impaled on the grill means. The fork means are supported on a fork arm and are movable with respect to the grill means to selectively remove a cooked hamburger patty. To this end, the fork arm is pivotally mounted to the means disposed above the grill means and fork means and a reservoir containing heated liquid disposed below. Means is provided for oscillating the grill means and fork means between a first position adjacent the impaling means through an intermediate loading/unloading position to a second position in which the grill means and fork means are immersed in the heated cooking liquid held in the reservoir. The grill means and fork means are moved in unison when moving from the impaling means into the reservoir, but separately, with the fork means leading the grill means, when moving from the reservoir toward the intermediate position and the impaling means, so that the fork means removes a cooked patty previously impaled on the grill means.

BRIEF DESCRIPTION OF THE DRAWINGS

FIG. 4 is a side elevation of an alternate embodiment of the device of FIGS. 1-3 in which the reservoir for the cooking liquid is supported on a stationary platform.

DETAILED DESCRIPTION OF THE PREFERRED EMBODIMENT

Figure 1:
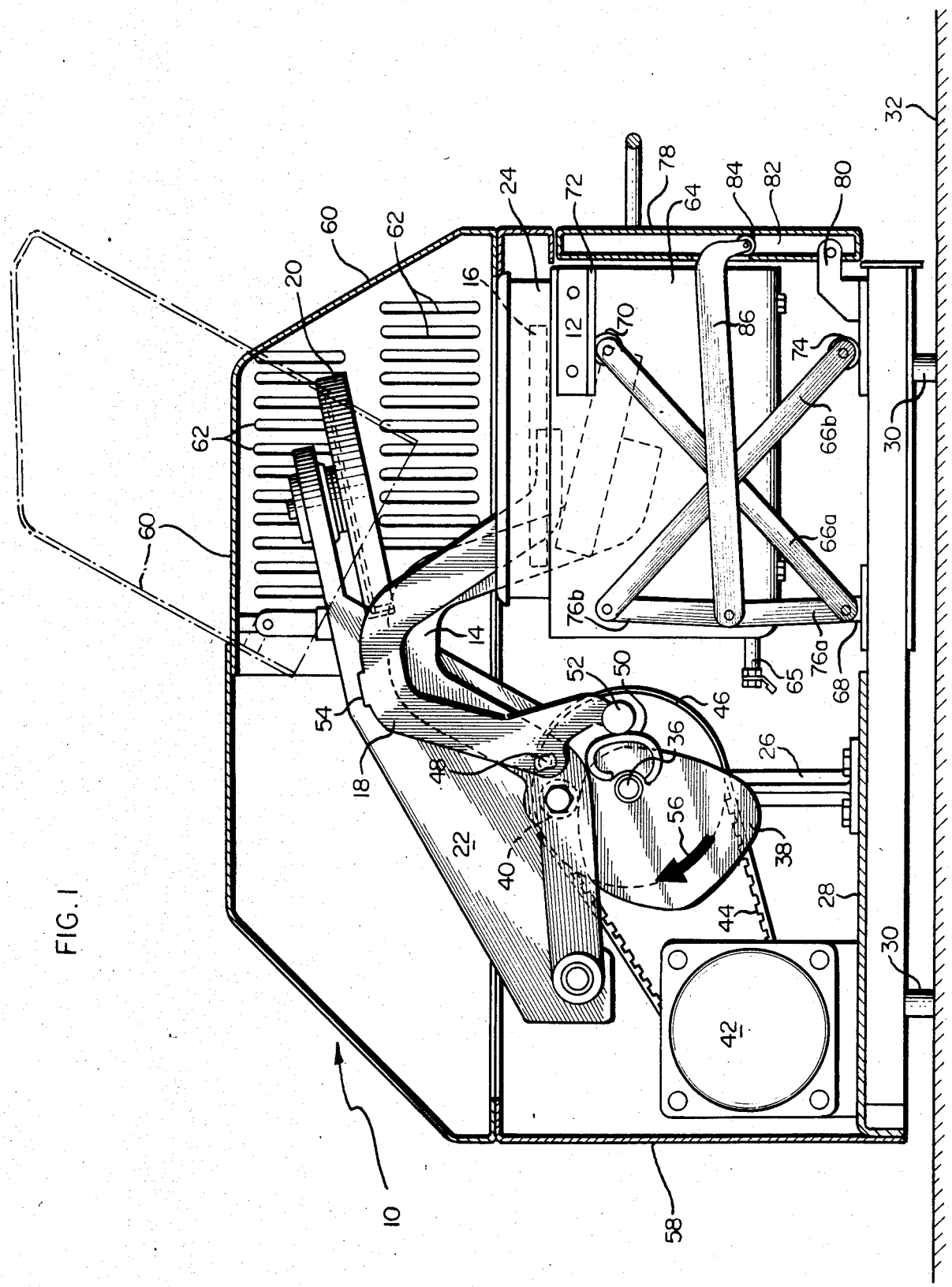
FIG. 1 is a side elevation of a hamburger cooking apparatus embodying the instant invention in which the device is positioned for removing a cooked hamburger patty or receiving an uncooked hamburger patty.
Figure 2:
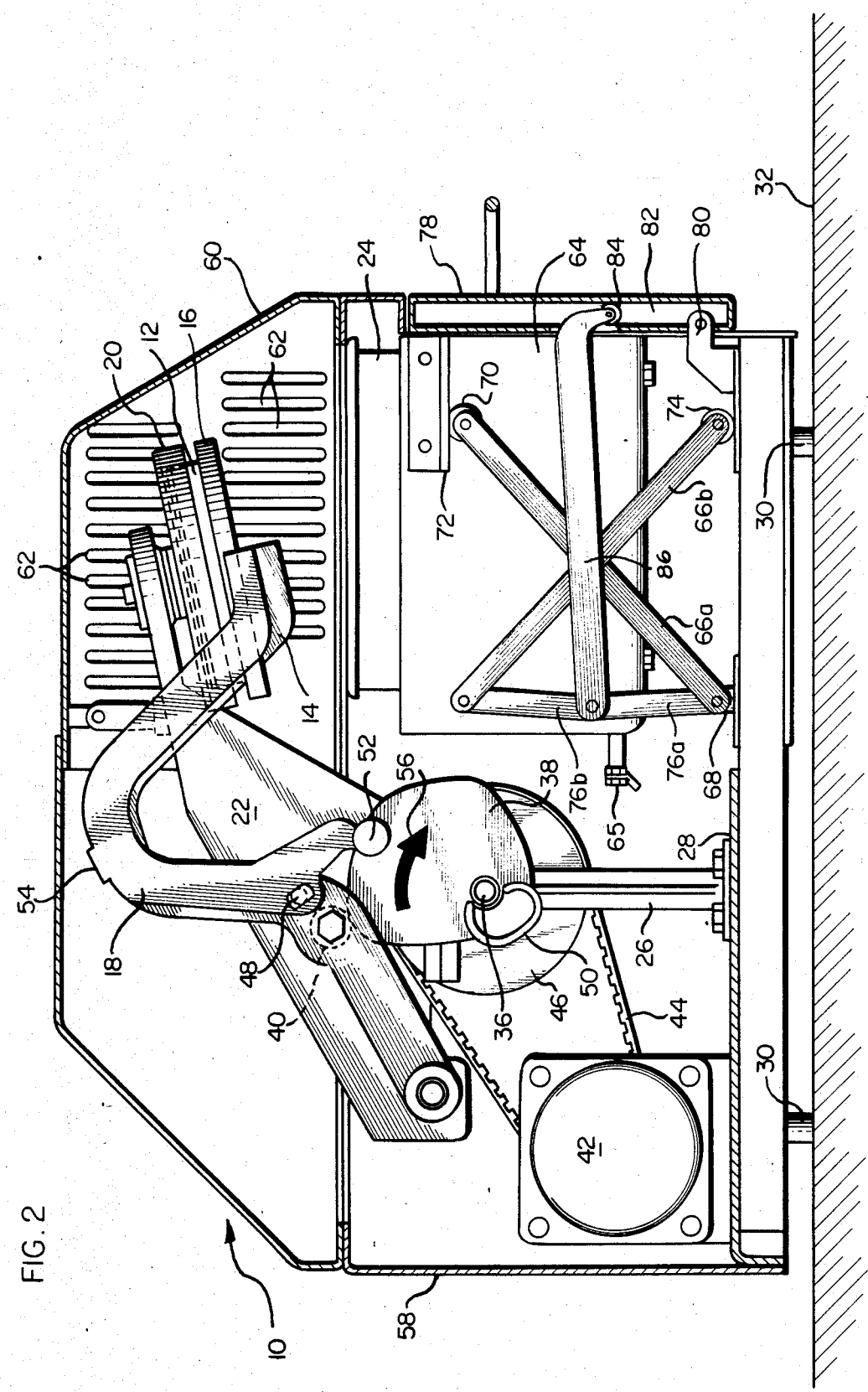
FIG. 2 is a side elevation of the device of FIG. 1 in which the arms of the device have been oscillated to their uppermost position in order to impale an uncooked hamburger patty on the grill member.
Figure 3:
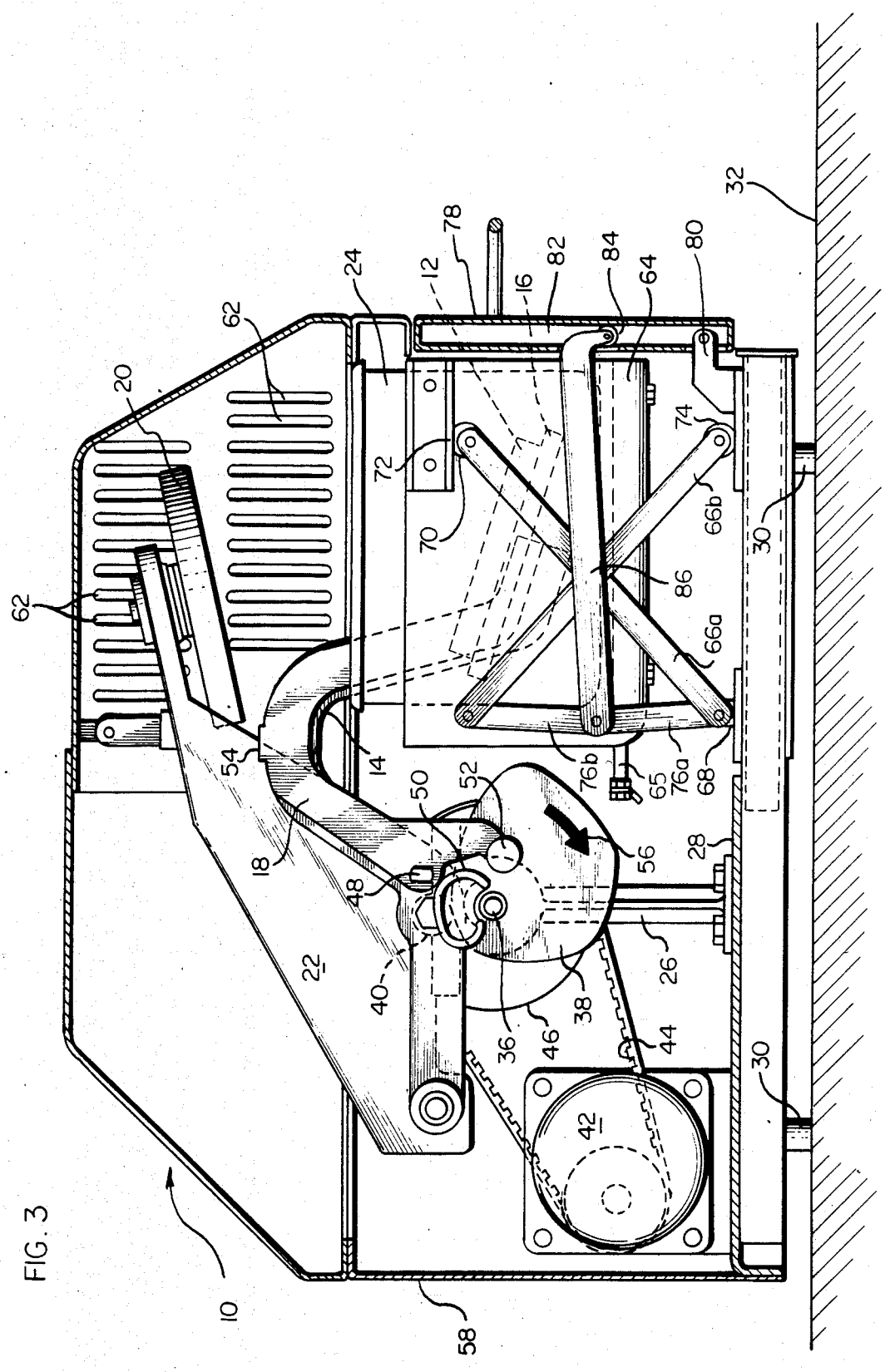
FIG. 3 is a side elevation of the device of FIG. 1 in which the arms of the device are at their lowermost point in which a hamburger patty impaled on the grill is lowered into a reservoir of heated liquid for cooking.

Turning to the figures of the drawing, which are by way of illustration and not limitation, there is seen in FIGS. 1-3 a side elevation of a hamburger cooking device, generally designated by 10, embodying the instant invention. While the illustrated device is designed for cooking a single hamburger patty at a time, the present invention contemplates grill being wide enough to accomodate the simultaneous cooking of a plurality of hamburger patties.

The device 10 includes grill means, generally indicated by 12, supported on a movable arm member 14. The grill means 12 includes a plurality of projecting heat-transfer fins arranged in parallel and on which a hamburger patty is impaled prior to its being cooked. Preferably, the grill means 12 has a substantial mass so that, once heated, it remains sufficiently hot to begin cooking a hamburger patty as soon as it is impaled on the heat-tranfer fins. Such heat-transfer fins are not shown but are best illustrated in the patents previously incorporated by reference. To remove an impaled patty from the projecting fins of the grill means 12, fork means, generally indicated by 16, that interfit with the grill means 12 are carried on a separate arm member 18 that is movable with respect to the grill means 12. As described in the above-referenced patents, fork means 16 underlies a hamburger patty during the cooking of the patty and is moved relative to the grill means 12 to remove a cooked patty from the projecting heattransfer fins of the grill means 12. The fork means 16 typically include an array of parallel ribs that interfit with the grill means to underlie the projecting fins. To impale a hamburger patty on the projecting fins of the grill means 12, an uncooked patty resting on top of the projecting fins is brought into contact with a stationary former or press plate 20 mounted on an arm member 22, which causes the projecting fins to penetrate the patty. In practice, the press plate 20 may be formed with a downward-projecting circumferential lip that serves to form and confine the hamburger patty as it is being impaled on the grill means 12. Once the patty is securely in place on the grill means 12, the arm member 14 moves to immerse the grill means 12 and the patty into a reservoir 24 that holds a heated cooking liquid.

In keeping with the invention, means is provided for oscillating the grill arm 14 and fork arm 18 between a first, upper position in which the grill means 12 and fork means 16 are adjacent the impaling means or press plate 20 in order to impale a hamburger patty on the projecting fins of the grill means 12, and a second, lower position in which a hamburger patty impaled on the grill means 12 with the fork means 16 lying underneath is disposed within the reservoir 24 so as to be immersed in heated liquid for cooking the patty. The oscillating means is such that the grill arm 14 and fork arms 16 travel in unison when moving from the upper position to the lower position, with the fork means 18 interfitting with the grill means 12. However, as the grill means 12 and fork means 16 are moved upward out of the reservoir 24 by the oscillating means, the fork arm 18 is moved upwardly with respect to the grill arm 14 so that fork means 16 separates from the grill means 12 and removes the cooked patty therefrom. In other words, the grill arm 14 and fork arm 18 move in phase during their down strokes, but are out of phase, with the fork arm 18 leading the grill arm 14, during their upstrokes.

Returning to the figures of the drawings, the device 10 includes an upright support member 26 which is bolted to a base plate 28, the latter having feet 30 to support the cooker 10 on, e.g., a countertop 32. The stationary former arm 22 is bolted to the upper end of the upright 26 so that the former 20 is disposed over the open upper end of the reservoir 24. An axle 34 is journaled in end of the arm 22 opposite the former 20 so as to pivotally support the grill arm 14. As illustrated, the grill arm 14 is formed with an inverted U-shaped bend that facilitates positioning the reservoir 24 relatively close to the support 26 while still permitting the grill means 12 to be lowered into the reservoir 24 and raised towards the former 20.

To oscillate the grill arm 14 between its upper and lower positions, a shaft 36 is journaled in the upright 26 which supports an eccentric cam 38 that engages a cam follower 40 mounted on the grill arm 14. To rotate the cam 38 and, consequently, oscillate the grill arm 14, the shaft 36 is rotated by means of a unidirectional motor 42 whose output shaft is connected by an endless drive belt 44 to a pulley 46 (partially obscured in the drawings by the cam 38) keyed to the shaft 36 so as to rotate in unison therewith. Alternatively, the shaft 36 may be rotated by a direct-drive motor (not shown).

To move the grill arm 14 and fork arm 18 in unison when moving from the uppermost position to the lowermost position, but to move the grill and fork out of phase, with the fork 16 leading the grill 12 when traveling from the lowermost position to the uppermost position, the fork arm 18 is pivotally mounted to the grill arm 14 by a pin 48. A second eccentric cam 50 is supported on the shaft 38, the cam 50 being sized to engage a cam follower 52 mounted to the fork arm 18 only when the cam 38 is simultaneously forcing the grill arm 12 upward. The fork arm 18 also includes an integral lip or stop 54 that projects transversely from the upper edge of the fork arm 18. The lip 54 rests on the upper edge of the grill arm 14 during the downward movement of the grill arm 14 and fork arm 18 (when the cam follower 52 for the fork arm 18 is free from engagement by the cam 50) thus limiting the downward movement of the fork arm 18 with respect to the grill arm 14.

The operation of the device 10 is most easily understood by referring sequentially to FIGS. 1-3. In FIG. 1, the grill arm 14 and fork arm 18 are positioned in their intermediate positions by their respective cams 38, 50 so that the fork 16 is separated from and overlying the grill 12. As such, the fork 16 is ready to have an uncooked hamburger patty placed thereon, while the grill 12 is submerged in the reservoir so that it is pre-heated by the cooking liquid. As the cams 38, 50 rotate in a clockwise direction, as indicated by the arrow 56, the grill arm 14 and fork arm 18 move upward until their positions coalesce at the former or press plate 20, as is seen in FIG. 2. The press plate 20 is contacted by the upwardly-moving hamburger patty, which is then forced onto or impaled by the fins of the grill 12. As can be seen in FIG. 2, when the grill arm 14 and fork arm 18 are at their uppermost position, the cam 50 no longer engages the cam follower 52 for the fork arm 18 and the lip 54 of the fork arm 18 rests on the upper edge of the grill arm 14 so that the grill arm 14 and fork arm 18 move in unison downwardly to lower the fork 16, grill 12, and hamburger patty into the reservoir 24, as is shown in FIG. 3. During such downward movement of the grill arm 14 and the fork arm 18, the cam follower 52 for the fork arm 18 is free from engagement by the cam 50, reengagement occurring at the start of the up stroke. During the up stroke, the grill arm 14 and fork arm 18 will return to the positions as shown in FIG. 1, in which the fork 16 is lifted upwardly from the grill 12 to separate the cooked patty therefrom. The cooked patty may then be removed from the cooker 10 by, e.g., a spatula, and the device 10 is ready to receive another uncooked patty.

In order to provide an easily-cleanable assembly, the grill means 12 of the preferred embodiment of the device 10 is made of a hardened, Teflon coated aluminum (which has a relatively high coefficient of conductivity and, thus, promotes the rapid cooking of a hamburger patty impaled thereon). Further, the other components that come into contact with the cooking liquid, such as the grill arm 14, the fork arm 18, and the reservoir 24, are also preferably coated with Teflon, while the fork means 16 is preferably made of stainless steel.

During operation, the motor does not need to be reversed to return the grill means 12 and fork means 16 to their initial positions due to the unique cam arrangement. This unidirectional operation greatly simplifies control of the device and promotes a longer and more trouble free life for the motor 42. However, there are periods during the operation of the device in which it is desired that the grill 12 and fork 16 be essentially motionless. Such a stationary period is desired, e.g., when the grill means 12 and fork means 16 are immersed in the cooking liquid held in the reservoir 24 (as shown in FIG. 3) to ensure that the patty remains in the liquid a sufficient time for it to be thoroughly cooked. Additionally, it is desired that the fork means 16 be stationary when in the intermediate position illustrated in FIG. 1 to facilitate the removal or placement of a hamburger patty thereon. Accordingly, to provide such stationary periods for the grill means 12 and/or fork means 16, the cams 38, 50 are irregularly shaped with the portion of the cam that controls the position of the grill arm 14 and fork arm 18 during the stationary periods having a substantially constant radius with respect to its axis of rotation. In other words, the portion of the cam, whether it be 38 or 50 that controls the position of the grill arm 14 or fork arm 18 during the loading/unloading of the hamburger patty and the cooking of the patty comprises a substantially circular arc that has the axis of rotation of the cam as its center of curvature. Further, the cams 38, 50 may include magnetic buttons (not shown) that activate a variable limit timer (also not shown) to control the rotation of the cams 38, 50.

It is contemplated that the entire device 10 will be in the form of a compact unit that is sized to fit, e.g., on a countertop, the unit measuring approximately 22 inches deep by 15 inches wide by 18 inches high. As illustrated, the device 10 is contained in a housing 58 that has a pivotable safety cover 60 that overlies the former 20 and has vapor exhaust slots 62. The cover 60 is movable upwardly to permit access to the fork 16 and grill 12. The cover 60 may also be provided with a switch (not shown) that permits operation of the motor 42 only when the cover 60 is closed, thus insuring that the operator is not unnecessarily exposed to the moving parts of the device 10. Because of the low operating temperature of the device 10, no additional ventilation means is required.

In keeping with another aspect of the invention, the housing 58 is constructed to provide easy access to the reservoir 24 for servicing the reservoir by, e.g., emptying, filling, or cleaning the reservoir 24. To this end, the reservoir 24 is preferably in the form of a stock pot that is placed on an elevatable platform 64. The platform 64 includes a standard heating element 65 disposed in the bottom thereof for heating the cooking liquid in the stock pot 24 and is supported by a pair of pivotally-connected scissoring links, generally indicated by 66, disposed on opposite sides of the platform 64. The link 66a is pivotally connected to the base plate 28 by a bracket 68 and includes a roller 70 that engages a horizontal guide bracket 72 secured to the platform 64. Similarily, the link 66b includes a roller 74 that rests on the base plate 28.

To pivot the links 66a, 66b, and thus raise or lower the platform 64, the ends of the links 66a, 66b opposite their respective rollers 70, 74 are connected by links 76a, 76b. The links 76a, 76b are, in turn, pivotally connected to each other at one end, while link 76a is also pivotally connected to bracket 68 and link 76b is pivotally connected to link 66b. As the links 76a, 76b approach a substantially vertical, straight line relationship, they limit the uppermost extent of the platform 64. However, as the links 76a, 76b are pivoted with respect to each other, they will cause the rollers 70, 74 in the links 66a, 66b to move toward each other, thus lowering the platform 64.

To provide access to the platform 64 and actuate the links 76a, 76b, the housing 58 includes a front panel 78 which is pivotally attached at the bottom thereof to the base plate 28 by a pair of brackets 80 (one of which is seen). The front panel 78 has an interior track 82, which captures a roller 84 disposed on the end of a link 86 which, in turn, is connected to the pivot point of the links 76a, 76b. Thus, by opening and closing the front panel 78, the link 86 is moved to control the angular relation between the link 76a, 76b. More particularly, when the front panel 78 is opened, the platform 64 (and thus the reservoir 24) will be lowered so that the reservoir 24 may be easily removed from the interior of the housing 58 by simply sliding it off the platform 64. The reservoir 24 may be replaced by reversing the steps and closing the front panel 78 to raise the reservoir 24 into its operative position. Alternatively, the reservoir 24 may be supported by a stationary platform 86, as illustrated in FIG. 4.

Thus, it can be seen that an apparatus for rapidly cooking food products such as hamburgers has been provided that fully meets the objects of the instant invention. While the invention has been described in terms of a preferred embodiment, there is no intent to limit the invention to the same. On the contrary, it is intended to include all modifications and equivalents within the scope of the appended claims.

I claim:

1. A device for cooking food products such as hamburger patties comprising:
   grill means of a heat conductive material for impaling and holding the food product;
   a grill arm having first and second ends, the first end supporting the grill means;
   support means for pivotally mounting the second end of the grill arm;
   fork means interfittable with the grill means so as to underlie a food product impaled thereon, the fork means being movable with respect to the grill means to selectively remove a food product impaled thereon;
   a fork arm having first and second ends, the first end supporting the fork means and the second end pivotally mounted with respect to the grill arm;
   stationary former means disposed above the first ends of the grill arm and fork arm for engagement with the grill means and fork means;
   reservoir means for containing a heated cooking liquid disposed below the first ends of the grill arm and fork arm; and
   oscillating means for moving the grill means and fork means between a first position adjacent the stationary former means and a second position in which the grill means and fork means are immersed in the heated cooking liquid held in the reservoir means, the grill means and the fork means being moved in unison when moving from their first position to their second position, but separately, with the fork means leading the grill means, when moving from their second position to their first position.

2. The combination of claim 1 wherein the oscillating means comprises:
   first eccentric cam means;
   cam follower means associated with the grill arm for engagement with the first eccentric cam means;
   second eccentric cam means;
   cam follower means associated with the fork arm for periodic engagement with the second eccentric cam means; and
   means for rotating the first and second eccentric cam means.

3. The combination of claim 2 wherein the means for rotating the first and second eccentric cam means comprises a pulley coaxially mounted with the cam means, a unidirectional electric motor, and a drive belt operatively connecting the motor to the pulley, rotation of the pulley by the motor thereby causing rotation of the cam means.

4. The combination of claim 2 further comprising stop means for preventing the downward movement of the fork arm with respect to the grill arm beyond the point where the fork arm is aligned with the grill arm and the fork means interfits with the grill means.

5. The combination of claim 4 wherein the stop means includes a lip integral with the upper edge of the fork arm extending transversely therefrom so as to be engageable with the upper edge of the grill arm.

6. The combination of claim 2 wherein the second eccentric cam means engages the cam follower associated with the fork arm only during movement of the fork means from its second position to its first position.

7. The combination of claim 2 wherein the first and second eccentric cam means are irregularly shaped, with portions of the cams having substantially constant radii with respect to the axis of rotation of the cams so as to provide periods during the rotation of the cams when the grill arm and fork arm remain substantially stationary.

8. The combination of claim 1 wherein the reservoir means is supported on an elevatable platform that raise the reservoir into a first, operative position and lowers the reservoir to a second, servicing position.

9. The combination of claim 8 wherein the device includes a housing having a pivotable panel for providing access to the reservoir means, the closing of the panel causing the elevatable platform to raise the reservoir means to the first position and the opening of the panel causing the elevatable platform to lower the reservoir to the second position.

10. The combination of claim 9 wherein the elevatable platform is supported by a plurality of pivotable links operatively connected to the pivotable panel so as to be actuated to raise of lower the elevatable platform upon the closing or opening of the panel.

* * * * *